(12) United States Patent
Quentin

(10) Patent No.: US 8,387,260 B2
(45) Date of Patent: Mar. 5, 2013

(54) PISTACHIO NUT OPENER

(76) Inventor: Malcolm Charles Quentin, Colorado Springs, CO (US)

( * ) Notice: Subject to any disclaimer, the term of this patent is extended or adjusted under 35 U.S.C. 154(b) by 535 days.

(21) Appl. No.: 12/924,508

(22) Filed: Feb. 12, 2010

(65) Prior Publication Data

US 2011/0283541 A1    Nov. 24, 2011

Related U.S. Application Data

(60) Provisional application No. 61/214,616, filed on Apr. 27, 2009.

(51) Int. Cl.
*A23N 5/00*  (2006.01)
(52) U.S. Cl. ..................................... 30/120.1
(58) Field of Classification Search ...... 30/120.1–120.5, 30/120; 99/498
See application file for complete search history.

(56) References Cited

U.S. PATENT DOCUMENTS

| | | | | |
|---|---|---|---|---|
| 944,827 A * | 12/1909 | Sheldon | ........................ | 30/120.1 |
| D172,357 S * | 6/1954 | Nelson | ........................... | D7/680 |
| 2,751,948 A * | 6/1956 | Facchini | ........................... | 99/564 |
| 2,757,666 A * | 8/1956 | Grant | ................................ | 606/53 |
| 3,301,290 A * | 1/1967 | Scalella et al. | .................. | 99/472 |
| 3,841,212 A * | 10/1974 | Powell | ............................. | 99/571 |
| 5,052,107 A * | 10/1991 | Hirzel | ........................... | 30/120.3 |
| 5,174,177 A * | 12/1992 | Jeromson et al. | ............... | 81/486 |
| 5,217,464 A * | 6/1993 | McDonald | .................... | 606/107 |
| 6,041,697 A * | 3/2000 | Maoz | ................................ | 99/572 |
| 6,378,213 B1* | 4/2002 | Griffith | ......................... | 30/120.2 |
| 6,470,774 B2* | 10/2002 | Chang | ............................. | 81/302 |
| 6,609,303 B2* | 8/2003 | Rogel | ........................... | 30/120.4 |
| D482,251 S * | 11/2003 | Kelleghan | ........................ | D8/40 |
| 6,968,987 B1* | 11/2005 | Reitano | ............................... | 225/1 |
| 7,909,682 B1* | 3/2011 | Goodman | ........................... | 452/6 |
| 2001/0002513 A1* | 6/2001 | Rogel | ........................... | 30/120.3 |
| 2002/0104219 A1* | 8/2002 | Olson | ........................... | 30/120.1 |
| 2008/0223893 A1* | 9/2008 | Petrie et al. | ....................... | 225/39 |

* cited by examiner

*Primary Examiner* — Sean Michalski

(57) ABSTRACT

A handheld pistachio nut opener that is box-shaped comprising an upper and lower piece, each with one protrusion that are oriented vertically but aligned horizontally and inserted into an open or partially open pistachio nut, and through manual compression of the apparatus between the thumb and forefinger, the protrusions travelling in opposite directions through translational vertical motion while remaining engaged with the pistachio nut shell halves until the shell halves break apart into two disjoined pieces revealing the edible portion inside, the arcs of the protrusions protecting the edible portion from being damaged.

7 Claims, 5 Drawing Sheets

FRONT PAGE VIEW

PISTACHIO NUT OPENER

Provisional Patent Application No. 61/214,616 dated Apr. 27, 2009

BACKGROUND OF THE INVENTION

The scope of the present invention is the method and apparatus for breaking apart pistachio nut shells into two disjoined halves by an individual at the time of consumption. The pistachio nuts must have at least partially opened sutures.

Pistachios are the seed of a small tree of the cashew family. They are referred to as nuts and they come in a hard smooth shell. This shell tends to split naturally along a longitudinal seam, called a suture, when the nut matures. When a suture is open, the opening is a majority of the length longitudinally and distinguishes two halves attached around one end of the pistachio nut.

Usually, 80 to 85% of a normal crop of pistachio nuts will have open sutures when they are picked from the tree. A closed nut is one that is unopened or has a partially opened suture.

Consumers of pistachios demand the shells be open along the majority of the suture. Open nuts are easier to break apart into two disjoined halves by the consumer in order to access the edible portion and eat it. However, easier does not necessarily mean easy.

Many pistachios available in the US market have gone through a process after being harvested in order to separate the split nuts from those that are closed. The methods for commercially splitting closed nuts have varied, to include hand splitting them to moisturizing the shells and squeezing them through a splitting apparatus in large quantities to provide an open split in the shell for packaging and distribution to retail outlets and the consumer.

Approximately 25 to 75% of packaged pistachios reaching the consumer are still not easy to break apart at the time of consumption. As a result, an effort is required to break apart the pistachio into two disjoined halves in order to access and eat the edible portion.

This effort often entails a method whereby the consumer places either the fingertips or the fingernails against the edges of the shell of an open or partially open pistachio nut and applies outward pressure to force the halves to break apart. As pistachios are seldom eaten singly, the fingertips or the fingernails can become torn or broken after a short period. Another method is for the consumer to bite the pistachio nut in order to split it or break it apart. This approach has led to broken teeth on many occasions. Still other methods by the consumer for breaking apart pistachio nuts have been to use various types of nut crackers, hammers or pliers, which can crush the edible portion. None of these methods is optimal.

Additionally, as much as 15% of packaged pistachios may be fully closed.

There are several patents whereby methods and apparatuses have attempted to provide a better solution. U.S. Pat. No. 4,462,156—Himelhoch, 2002/0104219—Olsen, U.S. Pat. Nos. 5,339,525—Sawyer and 6,609,303—Rogel all provide for handheld apparatuses that insert protrusions into an opening in a pistachio nut and by utilizing a pivoting or rotational motion, the protrusions force the shell halves apart until they break into two disjoined halves and the edible portion is accessible. Utilizing a pivoting or rotational motion is less than optimal in that the protrusions actually move in a circular direction away from the pistachio nut the moment compression of the apparatus begins. Some pistachio nuts spread open far relative to their size before they break apart. The relationship between the aforementioned devices and a pistachio nut is further complicated if the open part of the suture is at the opposite end of the shell and not on the side, as the shell halves open rationally as well. U.S. Pat. No. 4,462, 156—Himelhoch applies a raised portion to the protrusions to protect them from being inserted too far into the pistachio nut, but uses two flat protrusions facing one another, as does U.S. Pat. No. 6,609,303—Rogel. U.S. Pat. No. 5,339,524—Sawyer, aligns the edges of the protrusions in one horizontal plane, and by compressing the apparatus, forces the protrusions to move in a direction perpendicular to the horizontal plane of the protrusion tip blades. In this regard, U.S. Pat. No. 5,339,524—Sawyer improves over U.S. Pat. No. 6,609, 303—Rogel, but does not resolve the rotational aspect of the nut openers, and does not prevent the protrusion tips from being inserted too far into the pistachio nut, possibly causing damage to the edible portion.

Moreover, the design of U.S. Pat. No. 5,339,524—Sawyer may not be comfortable for an individual to use as a wire is narrow and will cause pressure to be focused on a concentrated portion of the thumb and fingers when used repeatedly in a short period of time. This design also allows for the apparatus to twist in the hand during compression.

Of consequence is the habit of consumers to eat many pistachios in one sitting further exacerbating any frustration of breaking apart pistachio nuts through less than optimal means, and possibly intensifying any damage to fingertips or fingernails.

SUMMARY OF THE INVENTION

For the consumer, it is the method of applying outward pressure from within the suture of the pistachio nut shell to force apart and separate the two halves, until disjoined, of an open or partially open pistachio nut, and the hand held apparatus with protrusions that are inserted into the opening of a pistachio nut shell, without causing damage to the edible portion, using a translational vertical motion upon manual compression between the thumb and forefinger, to perform such method, that is the purpose of the present invention.

Furthermore, it is the purpose of the present invention to provide a device that is more portable in size, is easier to hold and operate, and is more comfortable to hold and operate.

Additionally, it is the purpose of the present invention to be more effective at splitting apart and disjoining the pistachio shell halves; and to provide a more satisfying experience for an individual while consuming pistachio nuts.

Moreover, it is the purpose of the present invention to be sufficiently durable in design, material and assembly to allow an individual to use the apparatus repeatedly and on multiple occasions.

It is intended that the apparatus, once assembled, not be disassembled.

Accordingly, the present invention is provided for an open or partially open pistachio nut to be held in one hand with the split towards the opposing hand, while the apparatus is held in the opposing hand positioned between the thumb and forefinger in their natural resting positions, and with the protrusions under the tip of the thumb. The pistachio nut is placed and held against the apparatus so that the protrusions are inserted into the opening of the split pistachio nut shell. The apparatus is compressed by the thumb and forefinger which moves the protrusions along the line of compression by translational vertical motion in opposite directions, the protrusions remaining engaged with the edges of the pistachio shell halves, until the pistachio breaks apart into two disjoined halves and the edible portion is freed from the shell, the arcs of the protrusions protecting the edible portion from being damaged.

DESCRIPTION OF THE DRAWINGS

FRONT PAGE VIEW shows the assembled apparatus in the extended position.

DESCRIPTION OF THE INVENTION

Figure 1:
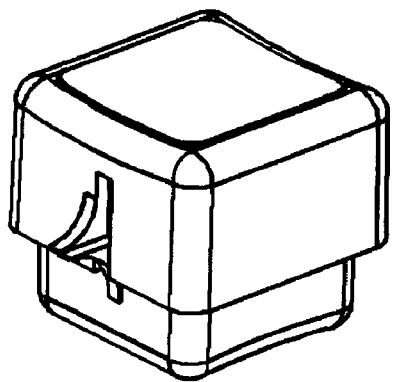
FIG. 1 shows the assembled apparatus in the extended position with an exploded view of the apparatus.
Figure 1:
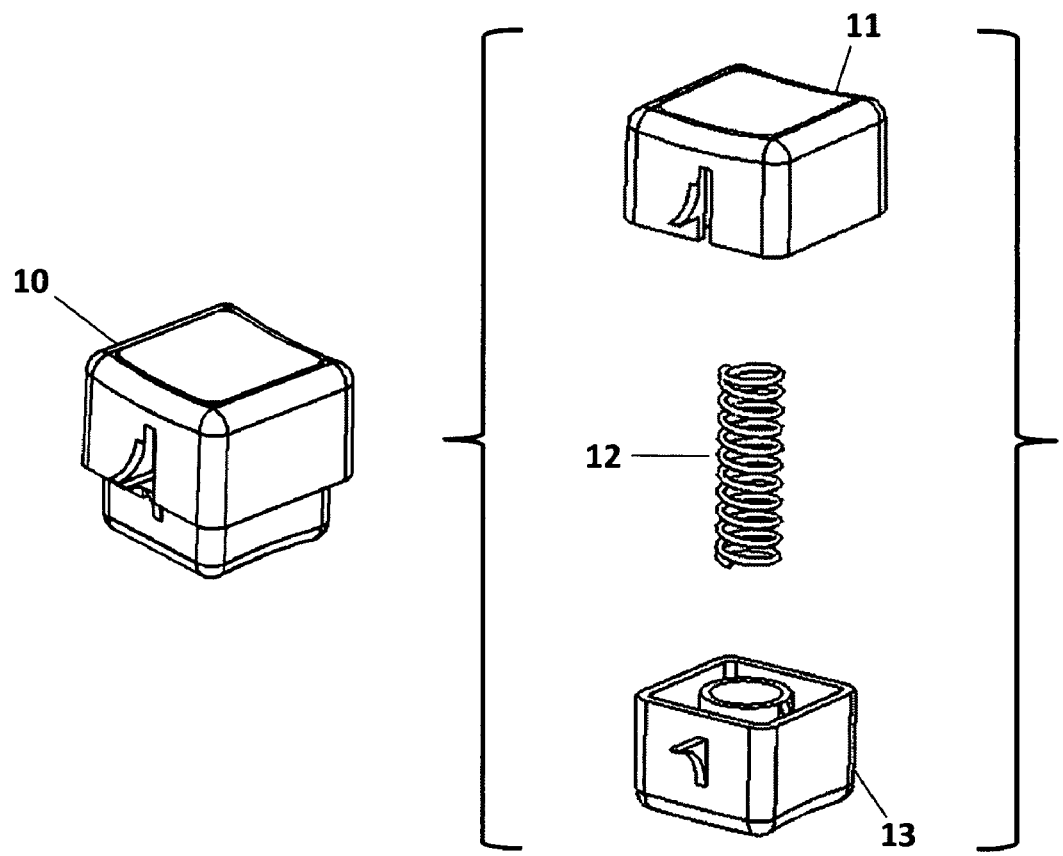
Figure 3:
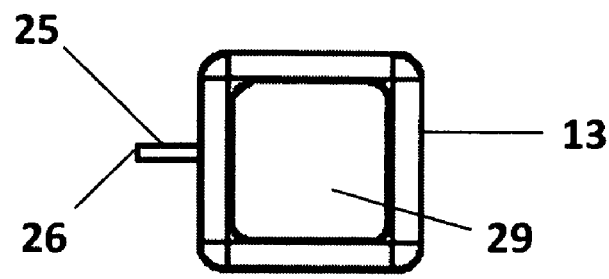
FIG. 3 shows the bottom piece from the front 3A, top 3B, side 3C and bottom 3D perspectives.
Figure 3:
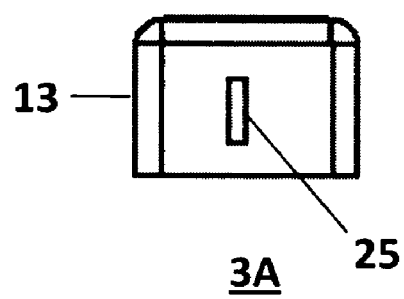
Figure 3:
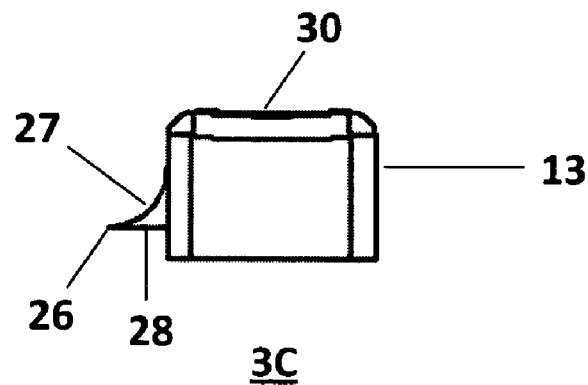
Figure 3:
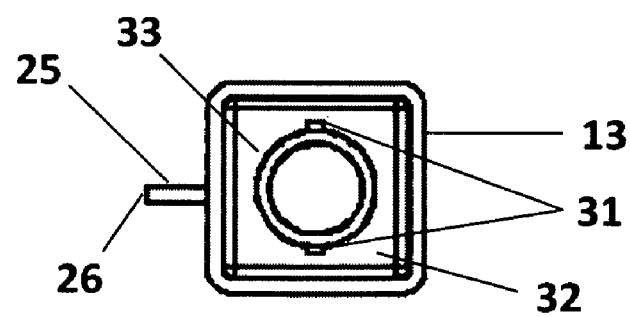
Figure 4:
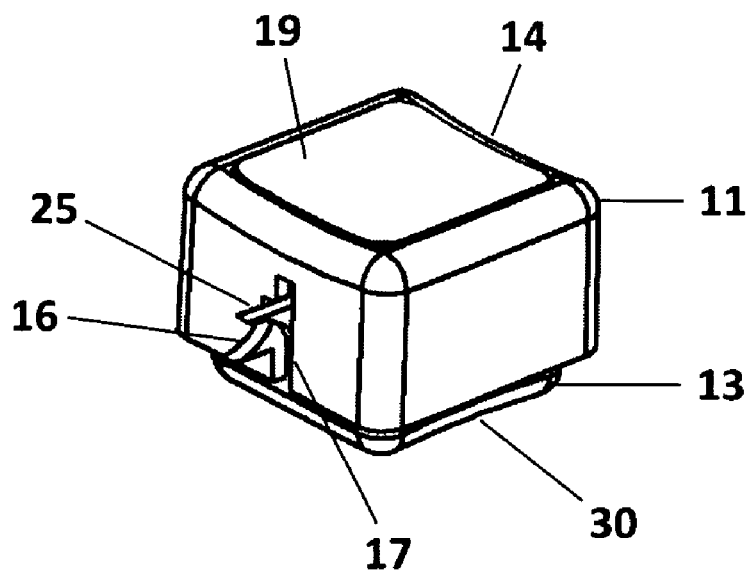
FIG. 4 shows the assembled apparatus in the compressed position.
Figure 5:
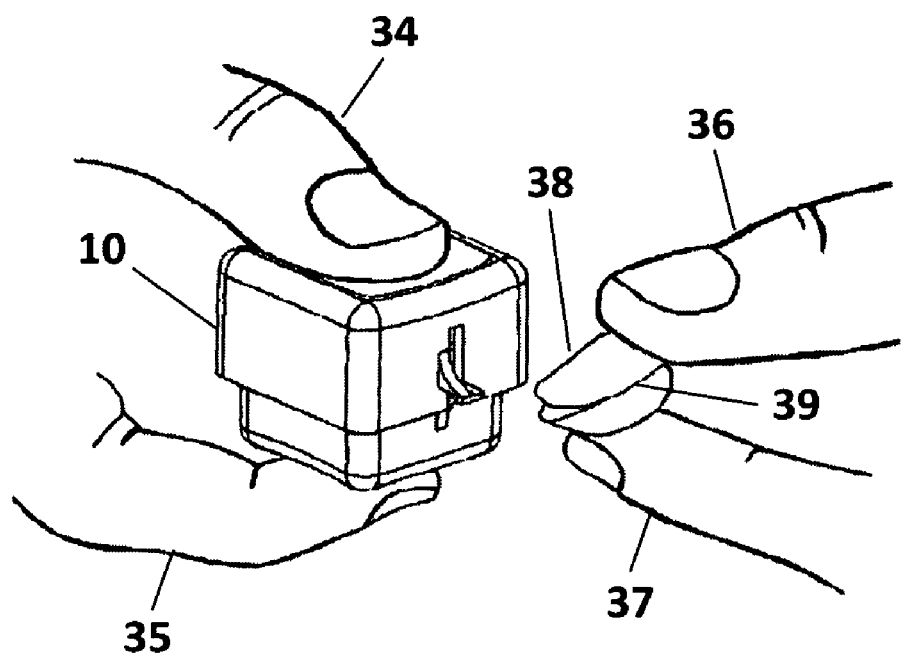
FIG. 5 shows the apparatus in the extended position being held by the individual in one hand and oriented to the pistachio nut held by the other hand.
Figure 6:
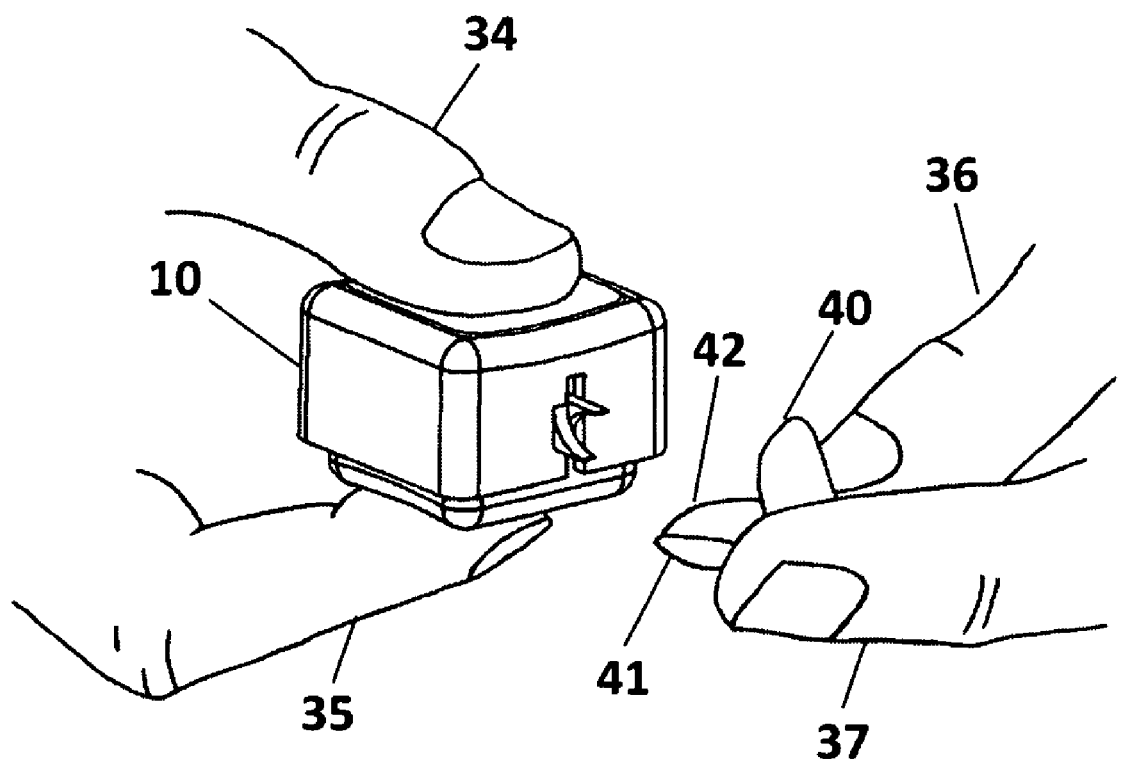
FIG. 6 shows the apparatus in the compressed position being held by the individual in one hand and, in the other hand, two disjoined halves revealing the edible portion.

Referring now in detail to the drawings, the type apparatus being depicted in FIGS. 1 to 6 is illustrated for the pistachio nut opener 10 in accordance with the present invention and which is specifically for the handheld use between the thumb 34 and forefinger 35 of one hand by an individual while consuming pistachios to better and more reliably separate the pistachio nut 38 into two disjoined halves 40 and 41 to access the edible portion 42 within (FIGS. 5 and 6). The pistachio nut opener 10 is comprised of three parts: the top piece 11; a compression spring 12, and; the bottom piece 13 (FIG. 1).

Figure 2:
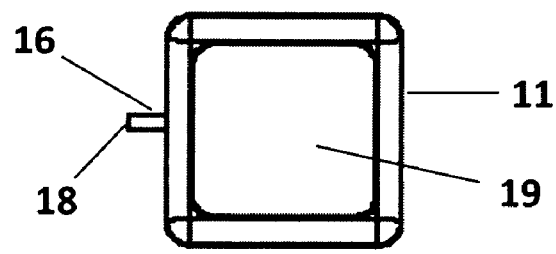
FIG. 2 shows the top piece from the front 2A, top 2B, side 2C and bottom 2D perspectives.
Figure 2:
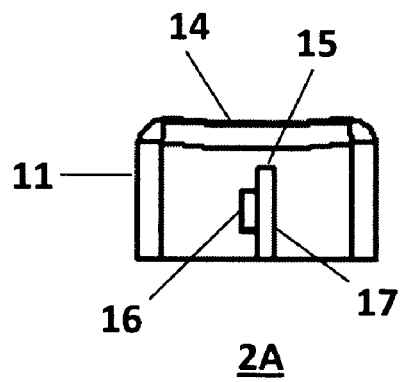
Figure 2:
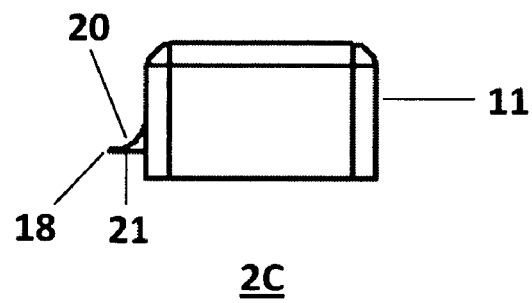
Figure 2:
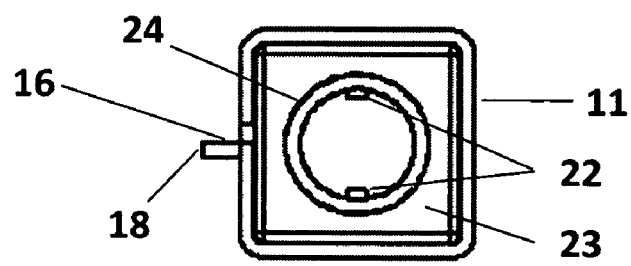

Referring to FIG. 2, the top piece 11 having an over mold 19 in the channel 14 for comfort and grip, and having a protrusion 16 adapted vertically from the open end 23 of the top piece 11 to the channel 14 of the top piece 11, and having a vertical cutout 17 adjacent to the protrusion 16 to accommodate the travel of the protrusion 25 of the bottom piece 13 when the apparatus is compressed (FIG. 4).

Referring to FIG. 3, the bottom piece 13, also having an over mold 29 in channel 30 for comfort and grip, and having a protrusion 25 that aligns beside, and in contact with, protrusion 16 of the top piece 11 as in the assembled and extended position, the protrusion 25 is partially within the cutout 17 of the top piece 11. The alignment of the tips 18 and 26 of protrusions 16 and 25 respectively, form a horizontal line perpendicular to the direction of travel during compression of the pistachio nut opener 10 when in the extended position (FIG. 1).

Referring to FIGS. 2 and 3, the internal open area 23 within the top piece 11 is adapted with a snap-fit cylinder 24 with two vertical grooves 22 cut into the internal wall of the snap fit cylinder 24 opposite of one another, while the internal open area 32 of the bottom piece 13 is adapted with a snap-fit cylinder 33 of a smaller diameter, so as to fit inside the snap-fit cylinder 24, and having two tabs 31 adapted to the external wall of the snap-fit cylinder 33, opposite of one another, which, when the top piece 11 and bottom piece 13 are assembled, the tabs 31 engaging the grooves 22, causing an interlocking of the snap-fit cylinders 24 and 33. The axis of the grooves 22, being aligned with the axis of the tabs 31 and with the concave channel 30 of the bottom piece 13, being perpendicular to the axis of the protrusions 16 and 25, the protrusions 16 and 25 being aligned with the concave channel 14 of the top piece 11. The assembled pistachio nut opener 10 having a compression spring 12 inserted into the snap-fit cylinder 33 of the bottom piece 13. As the bottom piece 13 is inserted into the top piece 11, the snap-fit cylinder 33 of the bottom piece 13 slides into the snap-fit cylinder 24 of the top piece 11, becoming interlocked, enclosing the compression spring 12. The assembled pistachio nut opener 10 is intended to be persistent, whereas disassembly will cause damage to the pistachio nut opener 10 and may render it inoperable.

Referring to FIGS. 2 and 3, the protrusions 16 and 25 are adapted vertically in a right angle triangle, the bases 21 and 28 of the triangle forming a right angle with the side of the top piece 11 and the side of the bottom piece 13 respectively, having a concave arc 20 and 27 along the hypotenuse of the triangle, transitioning from the side of the top piece 11 and the bottom piece 13 respectively, to the open ends 23 and 32 so that the junction of the hypotenuse 20 and 27 of the triangle and the base 21 and 28 of the triangle form the tip 18 and 26 of the protrusion 16 and 25 respectively. The line formed by joining the protrusion tips 18 and 26 is horizontal (FIG. 1), being perpendicular to the direction of travel of the protrusions 16 and 25 when the top piece 11 and the bottom piece 13 are compressed by an individual (FIG. 4).

Referring to FIGS. 2 to 4, when an individual manually compresses the assembled pistachio nut opener 10, the top piece 11 and the bottom piece 13 move simultaneously in a translational vertical motion until the travel is stopped by either the individual relenting the force of compression or the base 28 of the protrusion 25 of the bottom piece 13 comes in contact with the top 15 of the cutout 17 of the top piece 11, physically preventing further travel. The concave arcs 20 and 27 of the protrusions 16 and 25 protecting the edible portion 42 of the pistachio nut 38. Upon release of pressure from the thumb 34 and the forefinger 35 the pistachio nut opener 10 is resilient, having a compression spring 12, and returns to the extended position.

Referring to FIGS. 5 and 6, an individual holds the pistachio nut opener 10 between the thumb 34 and forefinger 35 of one hand, being that the apparatus can be used by either the left or right hand. The thumb 34 rests in the channel 14 of the top piece 11 with the thumb 34 in a natural position extended from the wrist along the axis of the forearm; the forefinger 35 rests in the channel 30 of the bottom piece 13 perpendicular to the channel 14 of the top piece 11 and the thumb 34, so the forefinger 35 has a natural curve inwards to the palm of the hand. The thumb 34 and forefinger 35 being in a position, and in relation to one another, natural as they would be if the arm was by one's side in the military position of attention.

Referring to FIGS. 5 and 6, when the pistachio nut opener 10 is held by an individual in one hand, the other hand grasps an open or partially open pistachio nut 38 so that the suture 39 is facing the protrusions 16 and 25 of the pistachio nut opener 10. The individual brings the two hands toward one another positioning the horizontally aligned protrusion tips 18 and 26 along the horizontally aligned suture 39 of the open or partially open pistachio nut 38 and coaxes the protrusion tips 18 and 26 within the opening so that the protrusion tips 18 and 26 engage the edges of the pistachio nut 38 shell halves 40 and 41 from inside the suture 39. Where the pistachio nut 38 is fully open, the protrusion tips 18 and 26 are positioned against the place where the shell halves 40 and 41 are still joined in order to provide the greatest leverage to the shell halves 40 and 41 when the pistachio nut opener 10 is compressed and the protrusion tips 18 and 26 travel in opposite directions perpendicular to the horizontal nature of the pistachio nut suture 39. The protrusion tips 18 and 26 are prevented from entering the pistachio nut 38 so far as to damage the edible portion 42 within by the concave arcs 20 and 27 of the triangle hypotenuse of the protrusions 18 and 26 (FIGS. 2 and 3). During or upon compression of the pistachio nut opener 10, the shell halves 40 and 41 will be forced to break apart and become two disjoined halves allowing the edible portion 42 to be accessed.

What is claimed:

1. A handheld pistachio nut opener for breaking apart into two disjoined halves a fully or partially open shell freeing from inside the shell the edible portion at the time of consumption, comprising:
   a. A box shaped device assembled from a top and a bottom piece;
   b. The open end of the lower piece, facing the open end of the upper piece, being able to fit inside and interlocked with the upper piece when assembled and operated;
   c. Being held and operated between the thumb and forefinger of one hand;
   d. Resilient by the use of a compression spring inside the assembled apparatus;
   e. Resting in the extended position;
   f. Adapted with a protrusion on the same side of each piece when assembled;
   g. The protrusions designed to penetrate the opening or partial opening of the pistachio nut, engaging the edges of the pistachio shells within the opening;
   h. Affecting the upper and lower protrusions to move in the direction of compression, the direction of travel of the protrusions being opposite, thus causing the two pistachio shell halves to spread further open and break apart into two disjoined halves and release the edible portion contained inside.

2. A handheld pistachio nut opener of claim 1, operated through translational vertical motion with equal pressure applied by the thumb and forefinger simultaneously so that both pieces are in motion.

3. A handheld pistachio nut opener of claim 1, adapted with a snap-fit cylindrical assembly comprising:
   a. A bottom piece with a cylinder smaller than the cylinder of the top piece so that the cylinder of the bottom piece will fit inside the cylinder of the top piece;
   b. The cylinder of the top piece having two opposing grooves in the internal wall of the cylinder and starting below the end of the cylinder to accept tabs on the cylinder of the bottom piece that snap into the grooves after passing the continuous cylinder wall above the grooves;
   c. The cylinder of the bottom piece having two opposing tabs adapted to the external wall of the cylinder that align with, and fit within, the grooves of the cylinder of the top piece;
   d. The axis of the grooves, being aligned with the axis of the tabs, is perpendicular to the axis of the protrusions so as to more securely provide a uniform transformational vertical motion.

4. A handheld pistachio nut opener of claim 3, with an opening in the top piece adjacent to the protrusion of the top piece, allowing for travel of the protrusion of the bottom piece during the translational vertical motion of compression and decompression, being sufficient to allow for unrestricted travel during full compression, allowing for consistent alignment of the protrusions at the beginning of each pistachio nut engagement.

5. A handheld pistachio nut opener of claim 4, having an over mold in the concave channels of both the top and bottom pieces for comfort and to provide a better gripping surface.

6. A handheld pistachio nut opener of claim 1, with a protrusion along one side of the bottom and top pieces, comprising:
   a. Vertical orientation from the base of the piece to the open end of the piece;
   b. A right angle triangle having a concave arc along its hypotenuse to prevent insertion into the pistachio beyond the shell edge, arcing to a smooth transition with the side of each piece towards the base and arcing to an edge with the base of the triangle forming the tip of the protrusion, the base of the triangle meeting the side of each piece at a right angle towards the open end, not being at the edge of the open end, allowing for an overlap when the two pieces are assembled;
   c. The tips, with the nut opener assembled and in the extended position, the protrusions aligned so that the tips form a line perpendicular to the direction of travel when the apparatus is compressed, being oriented geometrically opposite in shape, offset, adjacent to, and in contact with, one another, and;
   d. The tips, the protrusion tip edges forming a horizontal plane in relation to the vertical nature of the protrusions.

7. A handheld pistachio nut opener of claim 1, with an ergonomic concave channel from one side to the opposite side in the base of each piece to accommodate the thumb on the upper piece, and the forefinger on the lower piece, the two channels running perpendicular to each other.

\* \* \* \* \*